United States Patent
Zheng et al.

(10) Patent No.: US 11,936,220 B2
(45) Date of Patent: Mar. 19, 2024

(54) ENERGY STORAGE DEVICE AND SYSTEM, AND POWER SYSTEM

(71) Applicant: CONTEMPORARY AMPEREX TECHNOLOGY CO., LIMITED, Ningde (CN)

(72) Inventors: Chenling Zheng, Ningde (CN); Yanhua Lu, Ningde (CN); Jinbo Cai, Ningde (CN); Bingtuan Luo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 218 days.

(21) Appl. No.: 17/562,883

(22) Filed: Dec. 27, 2021

(65) Prior Publication Data
US 2022/0247197 A1    Aug. 4, 2022

Related U.S. Application Data

(63) Continuation of application No. PCT/CN2021/074486, filed on Jan. 29, 2021.

(51) Int. Cl.
*H02J 7/00*    (2006.01)
*H02J 3/32*    (2006.01)

(52) U.S. Cl.
CPC ............ *H02J 7/00304* (2020.01); *H02J 3/32* (2013.01); *H02J 7/0013* (2013.01); *H02J 7/0031* (2013.01)

(58) Field of Classification Search
CPC .......... H02J 7/00304; H02J 3/32; H02J 7/013; H02J 7/0031
See application file for complete search history.

(56) References Cited

U.S. PATENT DOCUMENTS

| 2013/0293020 A1 | 11/2013 | Shim |
| 2020/0144866 A1* | 5/2020 | Sinsabaugh ............. B60L 8/003 |

(Continued)

FOREIGN PATENT DOCUMENTS

| CN | 104578125 A | * | 4/2015 | ................ H02J 3/32 |
| CN | 104578125 A | | 4/2015 | |

(Continued)

OTHER PUBLICATIONS

The World Intellectual Property Organization (WIPO) International Search Report and Written opinion for PCT/CN2021/074486 dated Oct. 8, 2021 12 pages (including English translation).

(Continued)

*Primary Examiner* — Jared Fureman
*Assistant Examiner* — Duc M Pham
(74) *Attorney, Agent, or Firm* — ANOVA LAW GROUP, PLLC

(57) ABSTRACT

Embodiments of this application provide an energy storage device and system as well as a power system, and relate to the technical field of a power grid. The energy storage device includes: at least two parallel-connected energy storage units, where each energy storage unit includes: a battery cluster and a power conversion system; and the battery cluster includes at least two cells; a direct-current side of the power conversion system is electrically connected to the battery cluster, an alternating-current side of the power conversion system is configured to electrically connect to an input side of an alternating-current combiner cabinet, and an output side of the alternating-current combiner cabinet is configured to electrically connect to an alternating-current side of a transformer. The energy storage device is configured to improve safety and reliability of the energy storage system.

11 Claims, 6 Drawing Sheets

(56) References Cited

U.S. PATENT DOCUMENTS

| | | | |
|---|---|---|---|
| 2022/0077764 A1 | 3/2022 | She et al. | |
| 2023/0170711 A1* | 6/2023 | Wang .................. | H01M 10/48 |
| | | | 320/118 |

FOREIGN PATENT DOCUMENTS

| | | |
|---|---|---|
| CN | 207069596 U | 3/2018 |
| CN | 209982088 U | 1/2020 |
| CN | 210350800 U | 4/2020 |
| CN | 103138355 A | 3/2022 |
| EP | 3270455 A1 | 1/2018 |
| KR | 102033400 B1 | 10/2019 |
| WO | 2020134815 A1 | 7/2020 |

OTHER PUBLICATIONS

The European Patent Office (EPO) Extended Search Report for EP Application No. 21769624.4 dated Apr. 20, 2022 8 Pages.
The European Patent Office (EPO) Communication pursuant to Article 94(3) EPC for EP Application No. 21769624.4 dated Jun. 13, 2023 4 Pages.

* cited by examiner

ENERGY STORAGE DEVICE AND SYSTEM, AND POWER SYSTEM

CROSS-REFERENCE TO RELATED APPLICATIONS

This application is a continuation of PCT Patent Application No. PCT/CN2021/074486, filed on Jan. 29, 2021 and entitled "ENERGY STORAGE DEVICE AND SYSTEM, AND POWER SYSTEM", which is incorporated herein by reference in its entirety.

TECHNICAL FIELD

This application relates to the technical field of a power grid, and in particular, to an energy storage device and system, and a power system.

BACKGROUND

An energy storage system can implement peak load shaving for a power grid and maintain stability of the power grid; or, can meet a requirement of a distributed load of the power grid when a newly added load in the power grid is relatively small. In the prior art, an energy storage battery cluster (each battery cluster includes at least two cells) is separated from an inverter (a power conversion system). To be specific, a plurality of battery clusters are connected to a direct-current combiner cabinet, and the direct-current combiner cabinet is connected with the power conversion system.

A direct-current line between the battery cluster and the power conversion system is relatively long. Therefore, if aged and worn, the line is likely to cause a short circuit; and, if any battery cluster is short-circuited, other battery clusters will be short-circuited too. Moreover, when a voltage difference between a small number of battery clusters in the system is relatively large, such battery clusters need to be disconnected from the system, and electrical power of the energy storage system cannot be fully discharged. When the number of battery clusters with a relatively large voltage difference reaches a threshold, the system will be unable to work. Therefore, safety and reliability of an existing energy storage system are low.

SUMMARY

An objective of this application is to provide an energy storage device and system as well as a power system to improve safety and reliability of the energy storage system.

According to a first aspect, this application provides an energy storage device. The energy storage device includes: at least two parallel-connected energy storage units, where each energy storage unit includes: a battery cluster and a power conversion system; and the battery cluster includes at least two cells; a direct-current side of the power conversion system is electrically connected to the battery cluster, an alternating-current side of the power conversion system is configured to electrically connect to an input side of an alternating-current combiner cabinet, and an output side of the alternating-current combiner cabinet is configured to electrically connect to an alternating-current side of a transformer.

In contrast with the prior art, in this application, the battery cluster and the power conversion system are integrated in one energy storage device. Each energy storage unit of the energy storage device includes a battery cluster and a power conversion system. There is a power conversion system corresponding to each battery cluster. When the energy storage device is applied to an energy storage system, on the one hand, a connection distance between the battery cluster and the power conversion system is short, thereby avoiding a short circuit caused by aging and wear of a line. The power conversion system has a corresponding operating power, so that a short circuit will not cause overcurrent. On the other hand, the battery clusters are not connected to each other. Each battery cluster performs inversion or rectification separately, so that the voltage across a battery cluster will not affect another battery cluster. In addition, a charge capacity and a discharge capacity of each battery cluster can be adjusted for the battery cluster separately by controlling a charge power and a discharge power of the power conversion system, thereby improving a utilization rate of the energy storage system and making full use of the electrical power of the battery cluster. Therefore, the energy storage device not only improves the safety and reliability of the energy storage system, but also improves the utilization rate of the energy storage system.

With reference to the first aspect, in a first possible implementation of the first aspect, each energy storage unit further includes a first protection circuit. The first protection circuit is configured to protect the power conversion system and the battery cluster. One end of the first protection circuit is electrically connected to the battery cluster. The other end of the first protection circuit is electrically connected to a direct-current side of the power conversion system. The direct-current side of the power conversion system is electrically connected to the battery cluster through the first protection circuit.

In this application, after the power conversion system is integrated with the battery cluster, the power conversion system and the battery cluster can be protected concurrently through a protection circuit between them, thereby simplifying the circuit in contrast with existing technologies in which a protection circuit is disposed for the power conversion system and the battery cluster separately.

With reference to the first possible implementation of the first aspect, in a second possible implementation of the first aspect, the first protection circuit includes: an isolation module, a safety module, a main control module, and an overcurrent protection module. One end of the isolation module is electrically connected to the battery cluster. The other end of the isolation module is electrically connected to one end of the safety module. The other end of the safety module is electrically connected to one end of the main control module. The other end of the main control module is electrically connected to the direct-current side of the power conversion system. The overcurrent protection module is parallel-connected to the main control module.

In this application, the isolation module implements manual isolation protection between the battery cluster and the power conversion system, the safety module ensures the safety of the battery cluster and the power conversion system, the main control module implements main control on the battery cluster and the power conversion system, and the overcurrent protection module implements overcurrent protection between the battery cluster and the power conversion system.

With reference to the first possible implementation of the first aspect, in a third possible implementation of the first aspect, the first protection circuit includes: a safety module, a main control module, an overcurrent protection module, and an isolation module. One end of the safety module is electrically connected to the battery cluster. The other end of the safety module is electrically connected to one end of the main control module. The other end of the main control module is electrically connected to one end of the isolation module. The other end of the isolation module is electrically connected to the direct-current side of the power conversion system. The overcurrent protection module is parallel-connected to the main control module.

In this application, the isolation module implements manual isolation protection between the battery cluster and the power conversion system, the safety module ensures the safety of the battery cluster and the power conversion system, the main control module implements main control on the battery cluster and the power conversion system, and the overcurrent protection module implements overcurrent protection between the battery cluster and the power conversion system.

With reference to the first aspect and any one possible implementation of the first aspect, in a fourth possible implementation of the first aspect, an alternating-current side of the power conversion system is configured to electrically connect to one end of a second protection circuit. The other end of the second protection circuit is configured to electrically connect to an input side of the alternating-current combiner cabinet. The alternating-current side of the power conversion system is configured to electrically connect to the input side of the alternating-current combiner cabinet through the second protection circuit.

In this application, the second protection circuit at the alternating-current side of the power conversion system implements protection for the alternating-current side of the power conversion system.

With reference to the first aspect, in a fifth possible implementation of the first aspect, the power conversion system includes: a three-phase inverter bridge, a relay, and a circuit breaker. An input end of the three-phase inverter bridge is electrically connected to the battery cluster. An output end of the three-phase inverter bridge is electrically connected to one end of the relay. The other end of the relay is electrically connected to one end of the circuit breaker. The other end of the circuit breaker is configured to electrically connect to the input side of the alternating-current combiner cabinet.

In this application, a modular phase transition that includes a three-phase inverter bridge, a relay, and a circuit breaker implements effective adjustment of the charge capacity and the discharge capacity of the battery cluster corresponding to the power conversion system.

With reference to the first aspect, in a sixth possible implementation of the first aspect, the power conversion system includes: a three-phase inverter bridge, a contactor, and a circuit breaker. An input end of the three-phase inverter bridge is electrically connected to the battery cluster. An output end of the three-phase inverter bridge is electrically connected to one end of the contactor. The other end of the contactor is electrically connected to one end of the circuit breaker. The other end of the circuit breaker is configured to electrically connect to the input side of the alternating-current combiner cabinet.

In this application, a tower-type power conversion system that includes a three-phase inverter bridge, a contactor, and a circuit breaker implements effective adjustment of the charge capacity and the discharge capacity of the battery cluster corresponding to the power conversion system.

According to a second aspect, this application provides an energy storage system. The energy storage system includes: the energy storage device according to the first aspect or any one possible implementation of the first aspect; an alternating-current combiner cabinet, where an input side of the alternating-current combiner cabinet is electrically connected to the energy storage device; and a transformer, where an alternating-current side of the transformer is electrically connected to an output side of the alternating-current combiner cabinet.

In this application, through the energy storage device according to the first aspect and any one possible implementation of the first aspect, the energy storage system achieves high safety, high reliability, and a high utilization rate.

With reference to the second aspect, in a first possible implementation of the second aspect, the energy storage system further includes a third protection circuit. The output side of the alternating-current combiner cabinet is electrically connected to one end of the third protection circuit. The other end of the third protection circuit is electrically connected to the alternating-current side of the transformer.

In this application, the third protection circuit implements protection for the alternating-current combiner cabinet and the transformer, thereby further improving the safety of the energy storage system.

With reference to the second aspect, in a second possible implementation of the second aspect, the alternating-current combiner cabinet includes an alternating-current circuit breaker corresponding to each energy storage unit. One end of the alternating-current circuit breaker is electrically connected to an alternating-current side of a power conversion system in the energy storage unit corresponding to the alternating-current circuit breaker. The other end of the alternating-current circuit breaker is electrically connected to the alternating-current side of the transformer.

In this application, the alternating-current circuit breaker corresponding to each energy storage unit in the alternating-current combiner cabinet implements effective alternating-current junction.

According to the third aspect, this application further provides a power system. The power system includes: an optical-to-electrical conversion system; the energy storage system according to the second aspect or any one possible implementation of the second aspect, where the energy storage system is electrically connected to the optical-to-electrical conversion system; and a power grid, where the power grid is electrically connected to the energy storage system.

In this application, through the energy storage system characterized by high safety, high reliability, and a high utilization rate, the power system achieves high safety, high reliability, and a high utilization rate.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
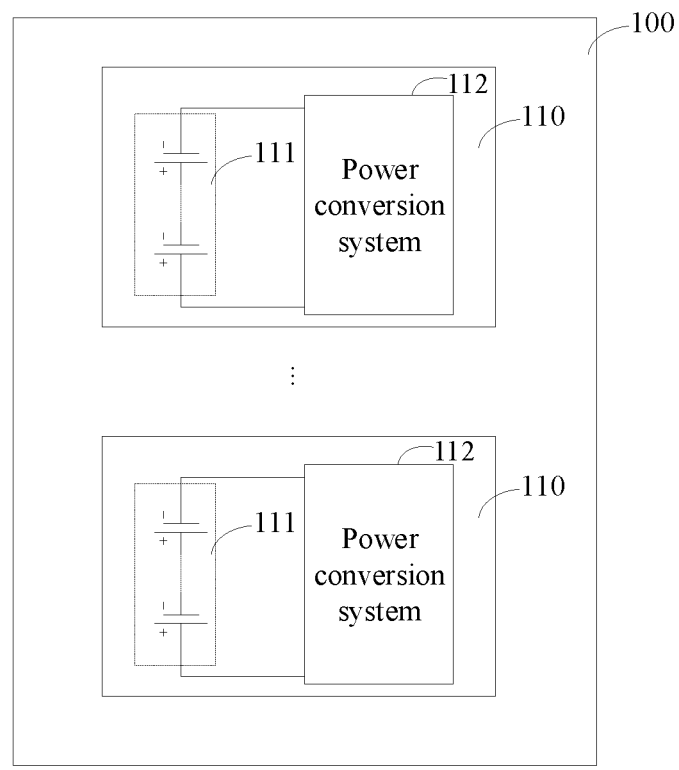
FIG. 1 is a circuit structure diagram of a first implementation of an energy storage device according to an embodiment of this application.

The drawings are not drawn to scale.

Reference numerals: 100—energy storage device; 110—energy storage unit; 111—battery cluster; 112—power conversion system; 113—first protection circuit; 700—energy storage system; 710—alternating-current combiner cabinet; 720—transformer; 900—power system; 910—optical-to-electrical conversion system; and, 920—power grid.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

An embodiment of this application provides: an energy storage device that can be connected to an energy storage system; an energy storage system to which the energy storage device is connected; and a power system to which the energy storage system is connected. For ease of understanding, in the embodiments of this application, the energy storage device is described first, then the energy storage system connected to the energy storage device is described, and finally the power system connected to the energy storage system is described.

Refer to FIG. 1, which is a schematic diagram of a first implementation of an energy storage device 100 according to an embodiment of this application. In FIG. 1, the energy storage device 100 includes at least two parallel-connected energy storage units 110. Each energy storage unit 110 includes: a battery cluster 111 and a power conversion system 112. The battery cluster 111 includes at least two cells.

The battery cluster 111 is connected to a direct-current side of the power conversion system 112. For an alternating-current side of the power conversion system 112, when the energy storage device 100 is connected to the energy storage system, the alternating-current side of the power conversion system 112 can be connected to an alternating-current combiner cabinet, and then connected to an alternating-current side of a transformer through the alternating-current combiner cabinet, so that the energy storage device 100 can be connected. Therefore, the alternating-current side of the power conversion system 112 is configured to electrically connect to an input side of the alternating-current combiner cabinet, and an output side of the alternating-current combiner cabinet is configured to electrically connect to an alternating-current side of the transformer.

In contrast with the prior art, in this embodiment of this application, the battery cluster 111 and the power conversion system 112 are integrated in one energy storage device 100. Each energy storage unit 110 of the energy storage device 100 includes a battery cluster 111 and a power conversion system 112. There is a power conversion system 112 corresponding to each battery cluster 111. When the energy storage device 100 is applied to an energy storage system, on the one hand, a connection distance between the battery cluster 111 and the power conversion system 112 is short, thereby avoiding a short circuit caused by aging and wear of a line. The power conversion system 112 has a corresponding operating power, so that a short circuit will not cause overcurrent. On the other hand, the battery clusters 111 are not connected to each other. Each battery cluster 111 performs inversion or rectification separately, so that the voltage across a battery cluster 111 will not affect another battery cluster. In addition, a charge capacity and a discharge capacity of each battery cluster 111 can be adjusted for the battery cluster separately by controlling a charge power and a discharge power of the power conversion system 112, thereby improving a utilization rate of the energy storage system and making full use of the electrical power of the battery cluster 111. Therefore, the energy storage device 100 not only improves the safety and reliability of the energy storage system, but also improves the utilization rate of the energy storage system.

In this embodiment of this application, the energy storage device 100 further includes a device body. At least two parallel-connected energy storage units 110 are disposed in the device body. The device body may be a cabinet. That is, the energy storage device 100 is in the form of an energy storage cabinet. Alternatively, the device body may be in other forms, and the forms are not limited in this embodiment of this application.

For the energy storage device 100, the parallel-connected energy storage units 110 are decentralized and independent, and can operate independently. Each energy storage unit 110 may be assembled in a distributed manner or a centralized manner. Regardless of the assembly manner, a good parallel connection effect can be achieved. The energy storage units are structurally modularized and expansible and are highly operable. When one of the energy storage units 110 is faulty, the faulty energy storage unit can be disconnected to avoid a crash of the entire device, thereby improving reliability of the device.

The power conversion system 112, abbreviated as PCS, can implement conversion between alternating-current and direct-current. A controller disposed for the power conversion system 112 can adjust the output power of the power conversion system. When the output power of the power conversion system 112 is changed, the charge capacity and the discharge capacity of the corresponding battery cluster 111 are also adjusted accordingly. For example, when temperatures of the battery clusters 111 in operation are inconsistent, and the temperatures of some battery clusters 111 reach a preset upper limit, the power conversion system 112 may be adjusted to limit a power output, so as to reduce a temperature rise of such battery clusters 111. The battery cluster 111 with a low temperature can still output a maximum power, and may work at the maximum withstandable power at a moment.

To implement the power adjustment of the power conversion system 112, this application discloses two optional manners of implementing power adjustment.

A first manner of power adjustment is: a controller is disposed for each energy storage unit 110 in the energy storage device 100 correspondingly, and the controllers are connected in communication to each other through an internal communications line. Through the internal communications line, information such as a voltage amplitude, a frequency, and a phase of the energy storage unit 110 corresponding to each controller can be synchronized. Each energy storage unit 110 starts and runs independently as a separate voltage source. When one of the energy storage units 110 needs to be shut down due to a fault, the energy storage unit 110 automatically exits the parallel connection system, and other controllers adjust the output power of the corresponding energy storage unit 110 based on currently obtained synchronization information, so as to ensure continuous operation of the entire energy storage device 100 and improve redundancy reliability of the entire energy storage device 100.

A second manner of power adjustment is: a controller is disposed for each energy storage unit 110 in the energy storage device 100 correspondingly, and the controllers are not connected in communication to each other at all. Each controller obtains the required information such as voltage amplitude, frequency and phase by using droop characteristics. Each controller includes a power calculation module. The power calculation module calculates an active power and a reactive power at an alternating-current output side of the power conversion system 112 based on the obtained information, and obtains an output voltage amplitude and a phase reference value by using a droop formula, so as to adjust the power of each corresponding power conversion system 112 separately, thereby avoiding breakdown of the entire energy storage device 100 caused by breakdown of one energy storage unit 110.

In this embodiment of this application, the power conversion system 112 may be a modular power conversion system 112 or a tower-type power conversion system 112.

Figure 2:
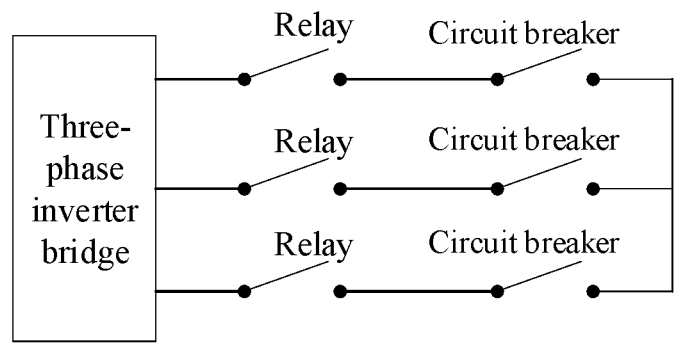
FIG. 2 is a schematic diagram of a modular power conversion system according to an embodiment of this application.

Referring to FIG. 2, which is a schematic structural diagram of a modular power conversion system 112, the power conversion system includes a three-phase inverter bridge, a relay, and a circuit breaker. An input end of the three-phase inverter bridge is electrically connected to a battery cluster 111. An output end of the three-phase inverter bridge is electrically connected to one end of the relay. The other end of the relay is electrically connected to one end of the circuit breaker. When the modular power conversion system 112 is connected to an energy storage system, the other end of the circuit breaker is configured to electrically connect to an input side of an alternating-current combiner cabinet. The three-phase inverter bridge includes three output ends. Therefore, there are three relays and three circuit breakers correspondingly.

In this embodiment of this application, the modular power conversion system 112 that includes the three-phase inverter bridge, the relay, and the circuit breaker implements effective adjustment of the charge capacity and the discharge capacity of the battery cluster 111 corresponding to the power conversion system.

Figure 3:
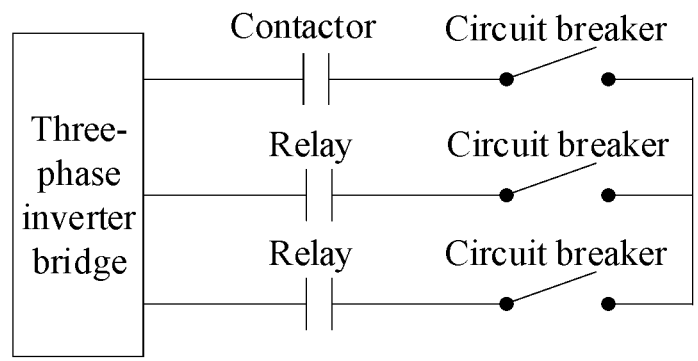
FIG. 3 is a schematic diagram of a tower-type power conversion system according to an embodiment of this application.

Referring to FIG. 3, which is a schematic structural diagram of a tower-type power conversion system 112, the power conversion system includes a three-phase inverter bridge, a contactor, and a circuit breaker. An input end of the three-phase inverter bridge is electrically connected to a battery cluster 111. An output end of the three-phase inverter bridge is electrically connected to one end of the contactor. The other end of the contactor is electrically connected to one end of the circuit breaker. When the tower-type power conversion system 112 is connected to an energy storage system, the other end of the circuit breaker is configured to electrically connect to an input side of an alternating-current combiner cabinet. The output end of the three-phase inverter bridge includes three output ends. Therefore, there are three contactors and three circuit breakers correspondingly.

In this embodiment of this application, the tower-type power conversion system 112 that includes the three-phase inverter bridge, the contactor, and the circuit breaker implements effective adjustment of the charge capacity and the discharge capacity of the battery cluster 111 corresponding to the power conversion system.

Figure 4:
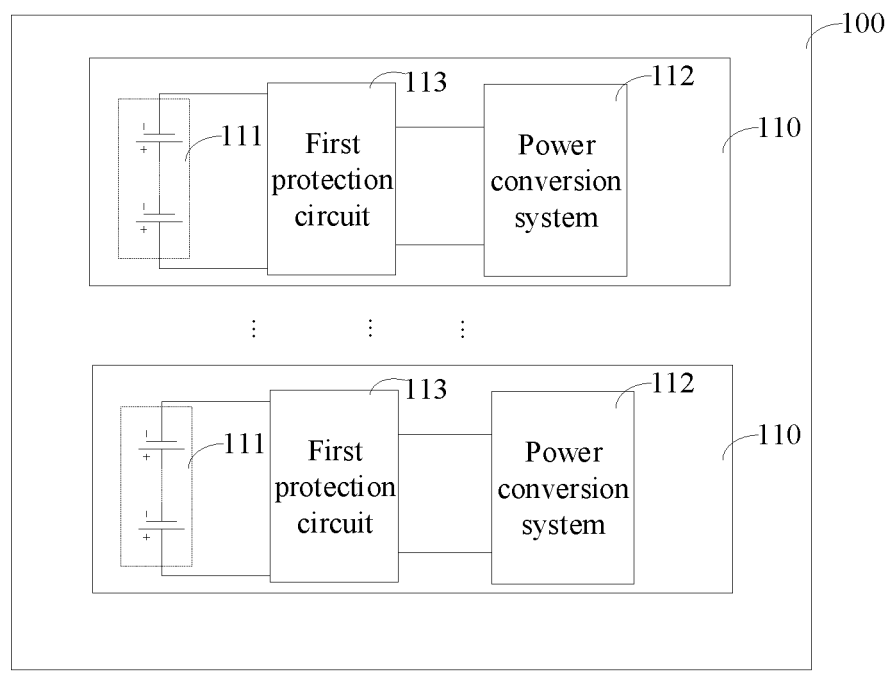
FIG. 4 is a circuit structure diagram of a second implementation of an energy storage device according to an embodiment of this application.

Refer to FIG. 4, which is a schematic structural diagram of a second implementation of an energy storage device 100 according to an embodiment of this application. In FIG. 4, each energy storage unit 110 further includes a first protection circuit 113. The first protection circuit 113 is configured to protect the power conversion system 112 and the battery cluster 111. One end of the first protection circuit 113 is electrically connected to the battery cluster 111. The other end of the first protection circuit 113 is electrically connected to a direct-current side of the power conversion system 112. The direct-current side of the power conversion system 112 is electrically connected to the battery cluster 111 through the first protection circuit 113.

In this embodiment of this application, after the power conversion system 112 is integrated with the battery cluster 111, the power conversion system 112 and the battery cluster 111 can be protected concurrently through a protection circuit between them, thereby simplifying the circuit in contrast with existing technologies in which a protection circuit is disposed for the power conversion system 112 and the battery cluster 111 separately.

As a first exemplary implementation of the first protection circuit 113, the first protection circuit 113 includes: an isolation module, a safety module, a main control module, and an overcurrent protection module. One end of the isolation module is electrically connected to the battery cluster 111. The other end of the isolation module is electrically connected to one end of the safety module. The other end of the safety module is electrically connected to one end of the main control module. The other end of the main control module is electrically connected to the direct-current side of the power conversion system 112. The overcurrent protection module is parallel-connected to the main control module.

In this implementation, the isolation module serves to implement manual isolation protection between the battery cluster 111 and the power conversion system 112. The safety module serves to ensure the safety of the battery cluster 111 and the power conversion system 112. The main control module serves to implement main control on the battery cluster 111 and the power conversion system 112. The overcurrent protection module serves to implement overcurrent protection between the battery cluster 111 and the power conversion system 112.

The isolation module may be an isolation switch. The safety module may be a fuse. The main control module may be a main control switch, such as a relay. The overcurrent protection module may include a switch and a resistor. As an example, referring to FIG. 5, which is a schematic diagram of a circuit structure of a first implementation of the first protection circuit 113, the isolation module is an isolation switch QS; the safety module includes a fuse 1 and a fuse 2. The main control module includes main relays K2 and K3. The overcurrent protection module is a pre-charging circuit that includes a main relay K1 and a resistor R1. The two fuses can protect an inverter inside the power conversion system 112 from overcurrent. The main relays K1 to K3 can control the battery cluster 111 to connect to the energy storage system. The pre-charging circuit can combine with an inverter bridge of the power conversion system 112 to form a charging circuit, so that the battery cluster 111 is prevented from being directly connected to the inverter of the power conversion system 112 and thereby from generating a high pulse current. The isolation switch QS can manually disconnect the battery cluster 111 from the energy storage system.

Figure 5:
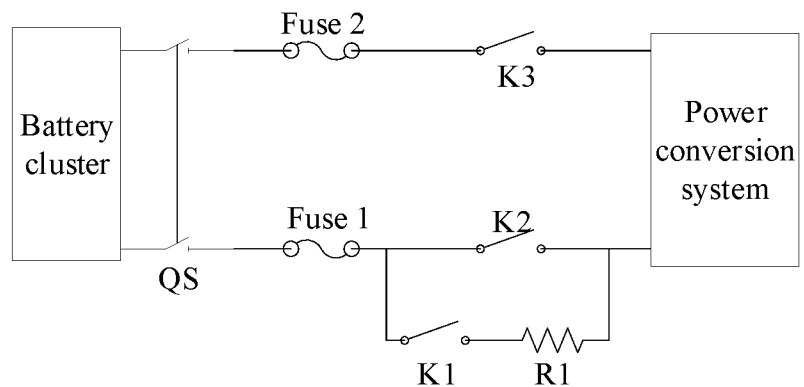
FIG. 5 is a circuit structure diagram of a first implementation of a first protection circuit according to an embodiment of this application.

FIG. 5 is merely an exemplary implementation of the first protection circuit 113. In practical applications, other practicable implementations may also be adopted for the isolation module, the main control module, the safety module, and the overcurrent protection module. For example, the isolation switch is an isolation switch with a fuse; and the main control module may include more main control switches, and the like.

As a second exemplary implementation of the first protection circuit 113, the first protection circuit 113 includes: a safety module, a main control module, an overcurrent protection module, and an isolation module. One end of the safety module is electrically connected to the battery cluster 111. The other end of the safety module is electrically connected to one end of the main control module. The other end of the main control module is electrically connected to one end of the isolation module. The other end of the isolation module is electrically connected to the direct-current side of the power conversion system 112. The overcurrent protection module is parallel-connected to the main control module.

The second exemplary implementation is similar to the first exemplary implementation, and includes the modules of the same functions, but differs in that the isolation module is located at the side of the battery cluster 111 in the first exemplary implementation, but is located at the side of the power conversion system 112 in the second exemplary implementation.

Figure 6:
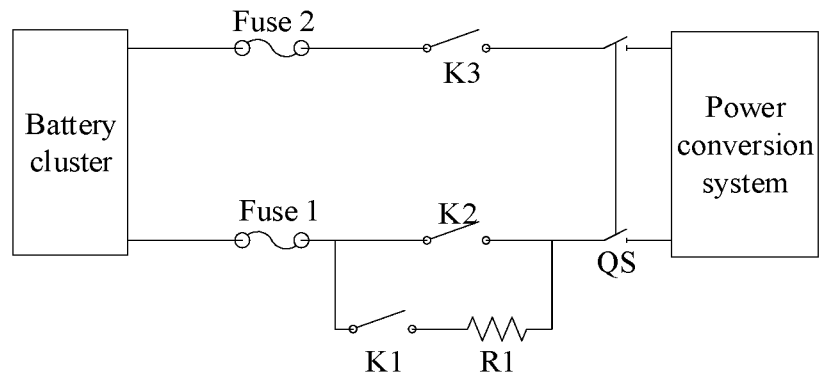
FIG. 6 is a circuit structure diagram of a second implementation of a first protection circuit according to an embodiment of this application.

As an example, referring to FIG. 6, which is a schematic diagram of a circuit structure of a second implementation of the first protection circuit 113, the isolation module is an isolation switch QS; the safety module includes a fuse 1 and a fuse 2. The main control module includes main relays K2 and K3. The overcurrent protection module is a pre-charging circuit that includes a main relay K1 and a resistor R1. The two fuses are located close to the battery cluster 111. When the battery cluster 111 is short-circuited, overcurrent protection can be implemented. The main relays K1 to K3 can control the battery cluster 111 to connect to the energy storage system. The pre-charging circuit can prevent a high current caused by an excessive voltage difference from other battery clusters 111. The isolation switch QS can manually disconnect the battery cluster 111 from the energy storage system.

FIG. 6 is merely an exemplary implementation of the second protection circuit. In practical applications, other practicable implementations may also be adopted for the isolation module, the main control module, the safety module, and the overcurrent protection module. For example, the isolation switch is an isolation switch with a fuse; and the main control module may include more main control switches, and the like.

In this embodiment of this application, a second protection circuit may be further disposed at the alternating-current side of the power conversion system 112. The alternating-current side of the power conversion system 112 is configured to electrically connect to one end of the second protection circuit. The other end of the second protection circuit is configured to electrically connect to an input side of the alternating-current combiner cabinet. The alternating-current side of the power conversion system 112 is configured to electrically connect to the input side of the alternating-current combiner cabinet through the second protection circuit.

The second protection circuit may adopt a protection circuit structure commonly used at the alternating-current side, and the protection circuit structure is not described in detail in this embodiment of this application.

The second protection circuit at the alternating-current side of the power conversion system 112 implements protection for the alternating-current side of the power conversion system 112.

Figure 7:
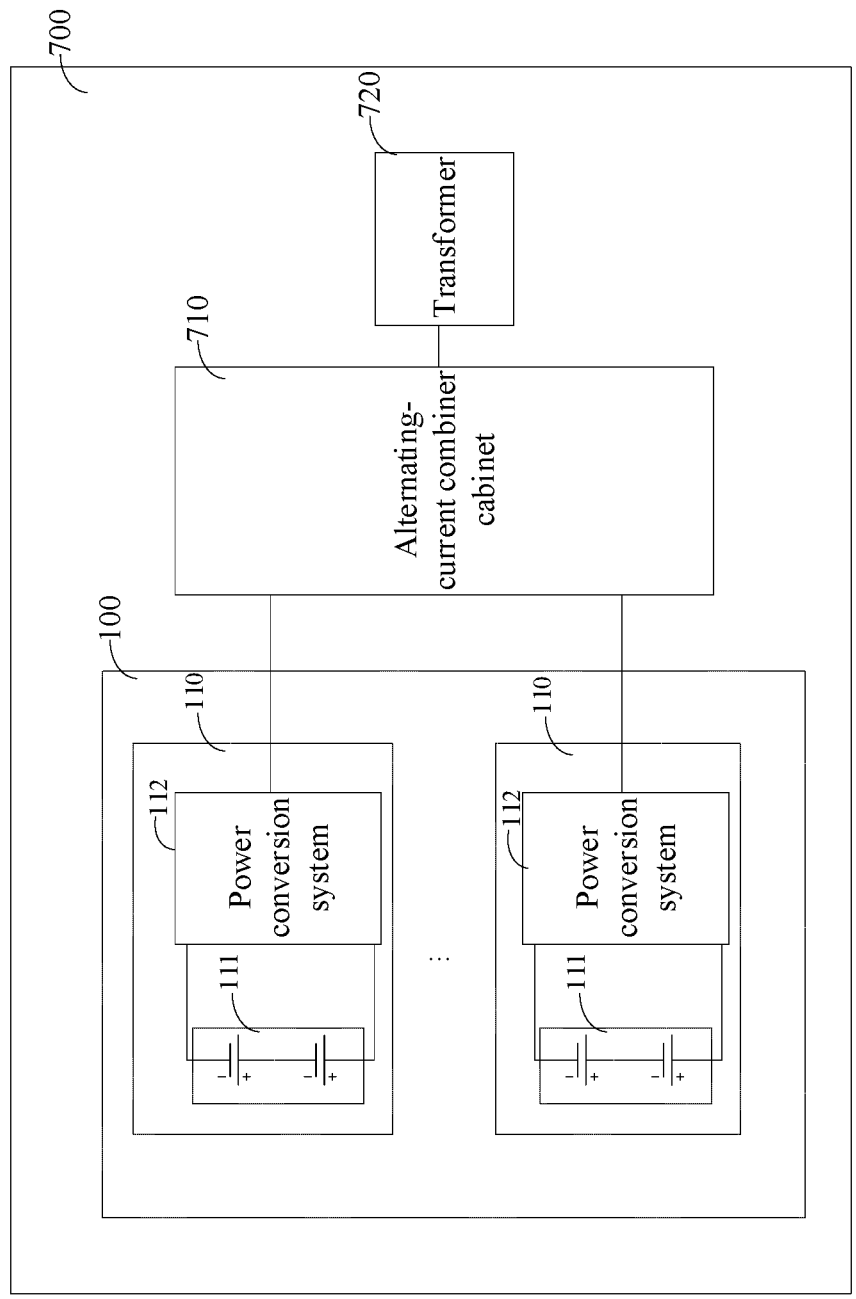
FIG. 7 is a schematic structural diagram of a first implementation of an energy storage system according to an embodiment of this application.

Based on the description of the energy storage device 100, referring to FIG. 7, which is a schematic structural diagram of an energy storage system 700 according to an embodiment of this application, the energy storage system 700 includes an energy storage device 100, an alternating-current combiner cabinet 710, and a transformer 720. An input side of the alternating-current combiner cabinet 710 is electrically connected to the energy storage device 100. An alternating-current side of the transformer 720 is electrically connected to an output side of the alternating-current combiner cabinet 710.

For the electrical connection manner between the input side of the alternating-current combiner cabinet 710 and the energy storage device 100, refer to the implementation of the energy storage device 100 in the foregoing embodiment.

As an exemplary implementation, the energy storage system 700 further includes a third protection circuit. The output side of the alternating-current combiner cabinet 710 is electrically connected to one end of the third protection circuit. The other end of the third protection circuit is electrically connected to the alternating-current side of the transformer 720. The third protection circuit may adopt a protection circuit structure commonly used between the alternating-current combiner cabinet 710 and the transformer 720 in the energy storage system 700, and the protection circuit structure is not described in detail in this embodiment of this application.

The third protection circuit implements protection for the alternating-current combiner cabinet 710 and the transformer 720, thereby further improving the safety of the energy storage system 700.

As an exemplary implementation, the alternating-current combiner cabinet 710 includes an alternating-current circuit breaker corresponding to each energy storage unit 110. One end of the alternating-current circuit breaker is electrically connected to an alternating-current side of a power conversion system 112 in the energy storage unit 110 corresponding to the alternating-current circuit breaker. The other end of the alternating-current circuit breaker is electrically connected to the alternating-current side of the transformer 720.

Understandably, the output of the power conversion system 112 of each energy storage unit 110 is a three-phase output. Therefore, there are three alternating-current circuit breakers corresponding to each energy storage unit 110.

In this implementation, the alternating-current circuit breaker corresponding to each energy storage unit 110 in the alternating-current combiner cabinet 710 implements effective alternating-current junction.

In addition, a protection module may be disposed in the alternating-current combiner cabinet 710. The protection module may be a commonly used combiner cabinet protection module, which is not described in detail in this embodiment of this application.

For the implementation of the energy storage device 100, reference may be made to the description in the foregoing embodiment, and details are not be repeated here.

Figure 8:
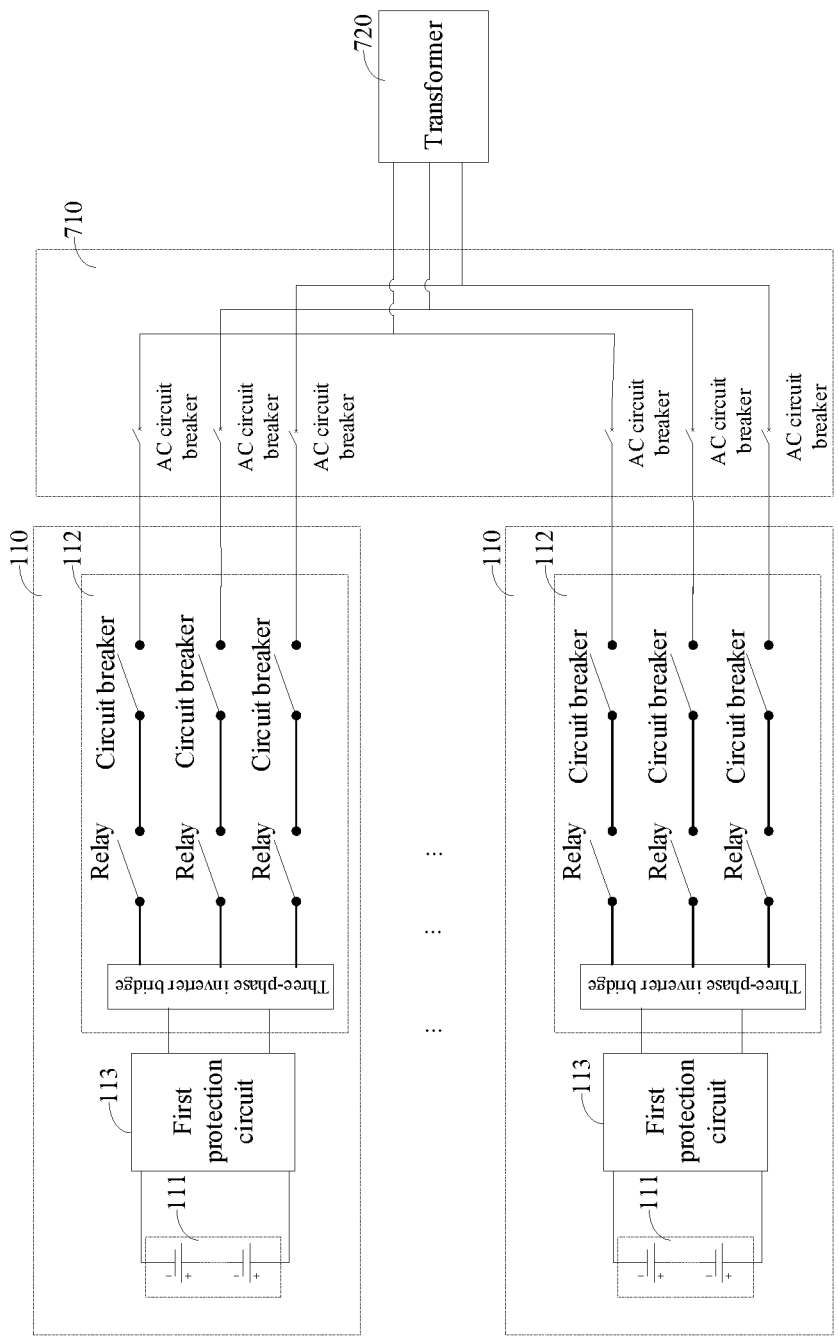
FIG. 8 is a schematic structural diagram of a second implementation of an energy storage system according to an embodiment of this application.

With reference to the description of various implementations above, refer to FIG. 8, which is a schematic diagram of an optional circuit structure of an energy storage system 700 according to this embodiment of this application. In FIG. 8, each energy storage unit 110 of the energy storage device 100 is connected to the alternating-current circuit breaker corresponding to the alternating-current combiner cabinet 710 separately. Each alternating-current circuit breaker of the alternating-current combiner cabinet 710 is connected to the transformer 720 separately. Each energy storage unit 110 adopts a circuit structure of a battery cluster 111 plus a first protection circuit 113 plus a modular power conversion system 112.

Through the energy storage device 100 according to this embodiment of this application, the energy storage system 700 achieves high safety, high reliability, and a high utilization rate.

Figure 9:
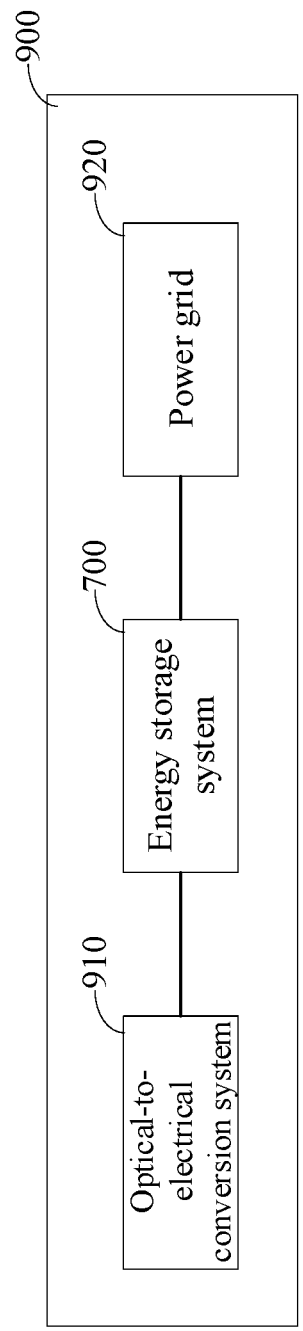
FIG. 9 is a schematic structural diagram of a power system according to an embodiment of this application.

Referring to FIG. 9, which is a schematic structural diagram of a power system 900 according to an embodiment of this application. The power system includes an optical-to-electrical conversion system 910, an energy storage system 700, and a power grid 920. The optical-to-electrical conversion system 910 is electrically connected to the energy storage system 700. The power grid 920 is electrically connected to the energy storage system 700. Specifically, the optical-to-electrical conversion system 910 may be connected to a direct-current input side of the energy storage system 700 to convert optical energy into electrical energy and store the energy. The power grid 920 may be connected to an alternating-current output side of the energy storage system 700 to apply the electrical energy stored in the energy storage system 700.

In this embodiment of this application, through the energy storage system 700 characterized by high safety, high reliability, and a high utilization rate, the power system 900 achieves high safety, high reliability, and a high utilization rate.

Although this application has been described with reference to exemplary embodiments, various improvements may be made to the embodiments without departing from the scope of this application, and the components therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. An energy storage device, comprising:
at least two parallel-connected energy storage units, wherein
each energy storage unit comprises: a battery cluster and a power conversion system; and the battery cluster comprises at least two cells;
a direct-current side of the power conversion system is electrically connected to the battery cluster,
an alternating-current side of the power conversion system is configured to electrically connect to an input side of an alternating-current combiner cabinet,
an output side of the alternating-current combiner cabinet is configured to electrically connect to an alternating-current side of a transformer,
the power conversion system comprises a three-phase inverter bridge, a switch device, and a circuit breaker, and
an input end of the three-phase inverter bridge is electrically connected to the battery cluster, an output end of the three-phase inverter bridge is electrically connected to one end of the switch device, the other end of the switch device is electrically connected to one end of the circuit breaker, and the other end of the circuit breaker is configured to electrically connect to the input side of the alternating-current combiner cabinet.

2. The energy storage device according to claim 1, wherein each energy storage unit further comprises: a first protection circuit; and the first protection circuit is configured to protect the power conversion system and the battery cluster; and
one end of the first protection circuit is electrically connected to the battery cluster, the other end of the first protection circuit is electrically connected to the direct-current side of the power conversion system, and the direct-current side of the power conversion system is electrically connected to the battery cluster through the first protection circuit.

3. The energy storage device according to claim 2, wherein the first protection circuit comprises:
an isolation module, a safety module, a main control module, and an overcurrent protection module, wherein
one end of the isolation module is electrically connected to the battery cluster, the other end of the isolation module is electrically connected to one end of the safety module, the other end of the safety module is electrically connected to one end of the main control module, the other end of the main control module is electrically connected to the direct-current side of the power conversion system, and the overcurrent protection module is parallel-connected to the main control module.

4. The energy storage device according to claim 2, wherein the first protection circuit comprises:
a safety module, a main control module, an overcurrent protection module, and an isolation module, wherein
one end of the safety module is electrically connected to the battery cluster, the other end of the safety module is electrically connected to one end of the main control module, the other end of the main control module is electrically connected to one end of the isolation module, the other end of the isolation module is electrically connected to the direct-current side of the power conversion system, and the overcurrent protection module is parallel-connected to the main control module.

5. The energy storage device according to claim 1, wherein the alternating-current side of the power conversion system is configured to electrically connect to one end of a second protection circuit, and the other end of the second protection circuit is configured to electrically connect to the input side of the alternating-current combiner cabinet; and the alternating-current side of the power conversion system is configured to electrically connect to the input side of the alternating-current combiner cabinet through the second protection circuit.

6. The energy storage device according to claim 1, wherein the switch device is a relay.

7. The energy storage device according to claim 1, wherein the switch device is a contactor.

8. An energy storage system, comprising:
the energy storage device according to claim 1;
the alternating-current combiner cabinet, wherein the input side of the alternating-current combiner cabinet is electrically connected to the energy storage device; and
the transformer, wherein the alternating-current side of the transformer is electrically connected to the output side of the alternating-current combiner cabinet.

9. The energy storage system according to claim 8, wherein the energy storage system further comprises a third protection circuit, the output side of the alternating-current combiner cabinet is electrically connected to one end of the third protection circuit, and the other end of the third protection circuit is electrically connected to the alternating-current side of the transformer.

10. The energy storage system according to claim 8, wherein the alternating-current combiner cabinet comprises:
an alternating-current circuit breaker corresponding to each energy storage unit; and
one end of the alternating-current circuit breaker is electrically connected to an alternating-current side of a power conversion system in the energy storage unit corresponding to the alternating-current circuit breaker; and the other end of the alternating-current circuit breaker is electrically connected to the alternating-current side of the transformer.

11. A power system, comprising:
an optical-to-electrical conversion system;
the energy storage system according to claim 8, wherein the energy storage system is electrically connected to the optical-to-electrical conversion system; and
a power grid, wherein the power grid is electrically connected to the energy storage system.

* * * * *